G. L. CURTIS.
FISHING REEL ATTACHMENT.
APPLICATION FILED AUG. 13, 1918.
1,307,960.
Patented June 24, 1919.
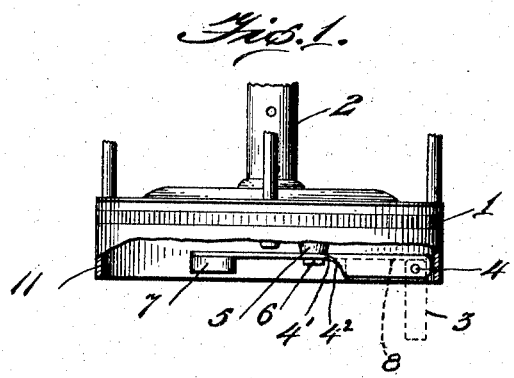
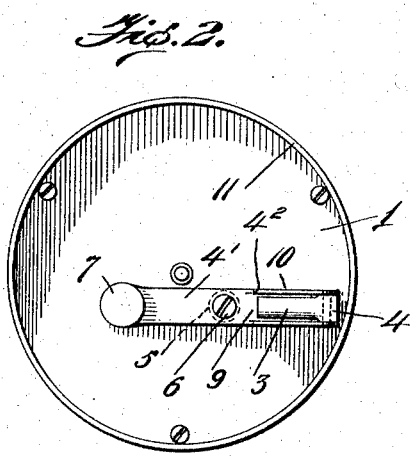
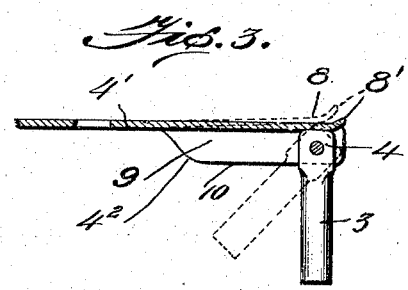
Inventor
George Lenox Curtis
By Franklin N. Hough
Attorney

UNITED STATES PATENT OFFICE.

GEORGE LENOX CURTIS, OF NEW YORK, N. Y.

FISHING-REEL ATTACHMENT.

1,307,960. Specification of Letters Patent. Patented June 24, 1919.

Application filed August 13, 1918. Serial No. 249,712.

*To all whom it may concern:*

Be it known that I, GEORGE LENOX CURTIS, a citizen of the United States, residing at New York city, in the county of and State of New York, have invented certain new and useful Improvements in Fishing-Reel Attachments; and do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in attachment to fishing reel and it has for its object the provision of a handle designed to normally lie flat with the crank bar to which it is attached and to occupy a concaved recess provided for its reception, so that the handle, when folded, will be substantially flush with the marginal edge of the peripheral extension of the reel within which the crank is housed.

The handle is provided with a spring interposed between the crank bar and handle, which spring when raised by means of an extension thereto will serve to permit the handle to be raised into operative position, the handle being returned by a firm downward pressure to its pocket or seat.

The essential object of the invention resides in the means provided, whereby the projections commonly carried by the reel may be omitted and the annoyance occasioned by the tangling of the line will be avoided.

The invention consists of various details of construction, combination and arrangement of parts which will be hereinafter fully described, shown in the accompanying drawings and then specifically defined in the appended claim.

I illustrate my invention in the accompanying drawings which, with the numerals of reference marked thereon, form a part of this application and in which:

Figure 1 is a plan view of a portion of the fishing reel with my improvement attached thereto, parts being broken away, in order to fully illustrate the invention.

Fig. 2 is a face view of the reel, and

Fig. 3 is an enlarged detail view of my improved handle detached.

Reference now being had to the details of the drawings by numerals:

1 designates one end of a fishing reel, provided with the usual rotating post 2 around which the line is wound, the usual gear mechanism (not shown) designed, upon the turning of the operating handle, to rotate the post, these parts being of ordinary construction.

A pivotal bar 4' having a counter-balance weight at one end is pivotally mounted upon the screw 6 engaging an aperture in the lug 5, and said bar has oppositely disposed flanges 10 along the marginal edges thereof adjacent to one end, said flanges being apertured for the reception of a pivot pin 4. The portion 9 of the bar intermediate said flanges is resilient and terminates at its free end 8 in an outwardly curved extension 8'. A handle 3 is pivotally mounted upon the pin 4 and its inner end is flat and adapted to bear against the yielding or resilient portion 9 intermediate the flanges when the bar is turned down into a folded position, as shown in Fig. 1 of the drawings. The portions of the handle 3 which bear against said resilient part, when the handle is either extended or folded, are adapted to bear flat against the resilient portions, and adapted to hold the handle in one or the other of its adjusted positions. The extension 8' forms means whereby the resilient portion may be pushed away from the inner end of the handle 3 by any means when it is desired to permit the handle to fold, or the latter may be folded by pushing upon the handle and causing the same to be closed.

11 is a peripheral circumferential flange extending outward from the end of the reel a sufficient distance to form a housing or chamber within which the handle may be rotated, said flange serving to prevent the line being tangled by the operation of the crank, as will be readily understood.

What I claim to be new is:

In a fishing reel, a pivotal bar mounted upon one end thereof and having oppositely disposed flanges upon its edges near one end, a portion of the bar intermediate said flanges being free and resilient, a handle pivoted to said flanges and having a flat end bearing against the resilient portion of the bar, and designed to be held by the latter when the handle is turned between said flanges.

In testimony whereof I hereunto affix my signature in presence of a witness.

GEORGE LENOX CURTIS.

Witness:
THEO. NEILSON.

Copies of this patent may be obtained for five cents each, by addressing the "Commissioner of Patents, Washington, D. C."